United States Patent [19]

Gay et al.

[11] Patent Number: 4,782,935
[45] Date of Patent: Nov. 8, 1988

[54] CLUTCH RELEASE BEARING ASSEMBLY IN PARTICULAR FOR AUTOMOBILE VEHICLES

[75] Inventors: Christian Gay, Paris; Philippe Lassiaz, Boulogne, both of France

[73] Assignee: Valeo, Paris, France

[21] Appl. No.: 37,174

[22] Filed: Apr. 10, 1987

[30] Foreign Application Priority Data

Apr. 18, 1986 [FR] France .................. 86 05575

[51] Int. Cl.[4] ............................................. F16D 23/14
[52] U.S. Cl. .................... 192/98; 192/70.13; 192/110 B; 192/DIG. 1
[58] Field of Search ............... 192/98, 110 B, 70.13, 192/89 B, DIG. 1

[56] References Cited

U.S. PATENT DOCUMENTS

| | | | |
|---|---|---|---|
| 4,228,882 | 10/1980 | Huber et al. | 192/98 |
| 4,529,075 | 7/1985 | Renaud | 192/98 |
| 4,613,027 | 9/1986 | Lassiaz et al. | 192/89 B |
| 4,632,237 | 12/1986 | Maycock et al. | 192/98 |
| 4,648,499 | 3/1987 | Despres et al. | 192/98 |
| 4,664,241 | 5/1987 | Renaud et al. | 192/98 |
| 4,667,800 | 5/1987 | Lassiaz et al. | 192/98 |
| 4,733,762 | 3/1988 | Gay et al. | 192/98 |
| 4,733,763 | 3/1988 | Gay et al. | 192/98 |

FOREIGN PATENT DOCUMENTS 2304826 10/1976 France .
2544035 10/1984 France .

*Primary Examiner*—Rodney H. Bonck
*Attorney, Agent, or Firm*—Charles E. Brown; Charles A. Brown

[57] ABSTRACT

A clutch release bearing assembly comprises a clutch release bearing adapted to be coupled to a clutch release device of a clutch by a coupling part attached to the clutch release device. This coupling part comprises a radial bearing flange adapted to bear axially on the clutch release device and an axial bush passing axially through the clutch release device. The assembly further comprises a drive part on the clutch release bearing and a fastening device operative in traction between the coupling part and the drive part. This fastening device fastens the coupling part and the drive part together in the axial direction from the clutch release device to the clutch release bearing. It comprises an annular coupling member carried by either the coupling part or the drive part. This is elastically deformable in the radial direction. There is a transverse drive bearing surface on the other part and the annular coupling member bears axially on this drive bearing surface. The end of the coupling member comprises two or more radial lugs and in the bush are respective openings each having a respective one of the lugs passing through it. The assembly further comprises a guide surface coaxial with the bush and a guide bearing surface forming part of this guide surface. Each lug is adapted to bear on the guide bearing surface.

14 Claims, 4 Drawing Sheets

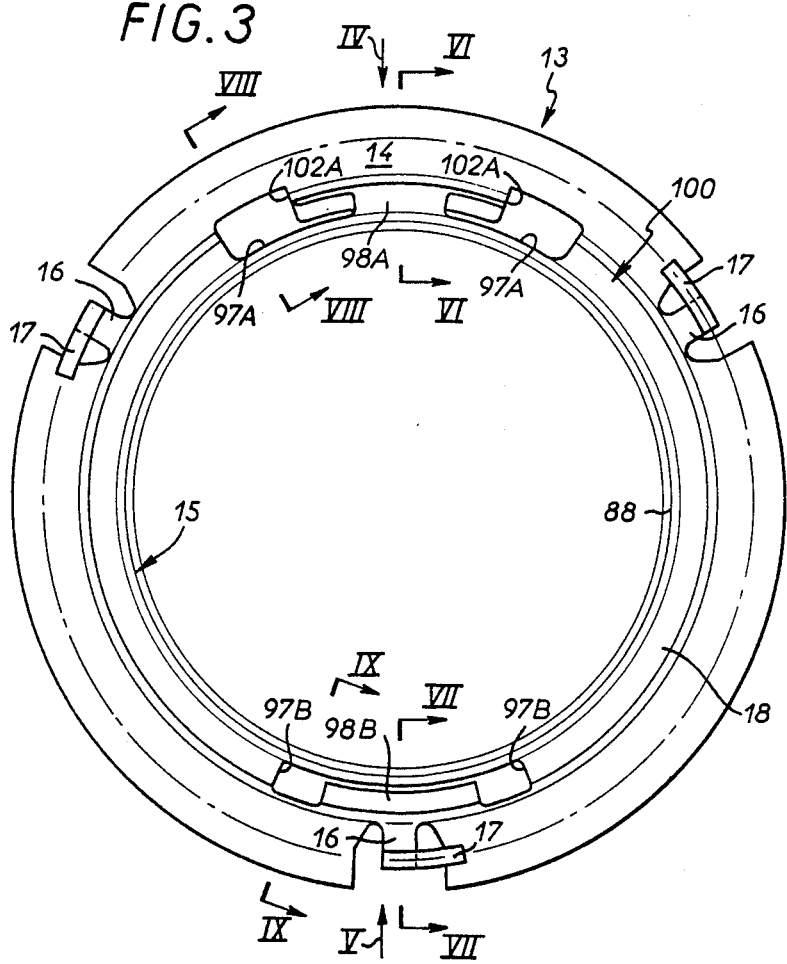
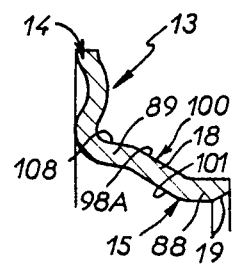
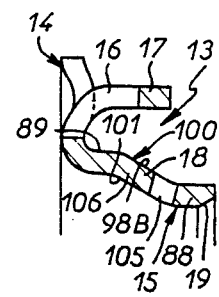
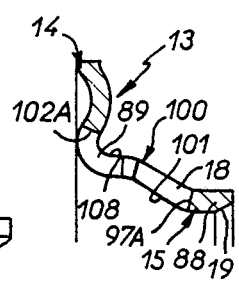
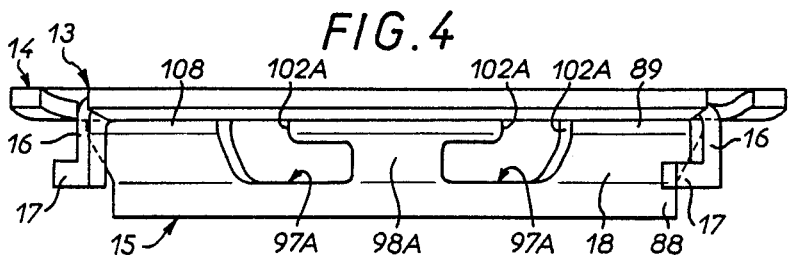
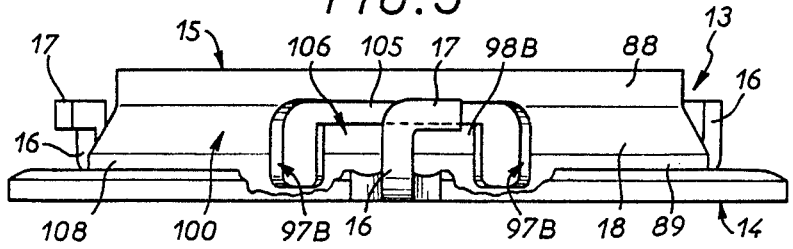
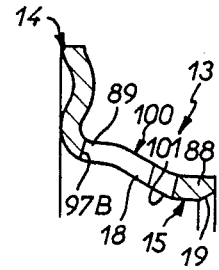

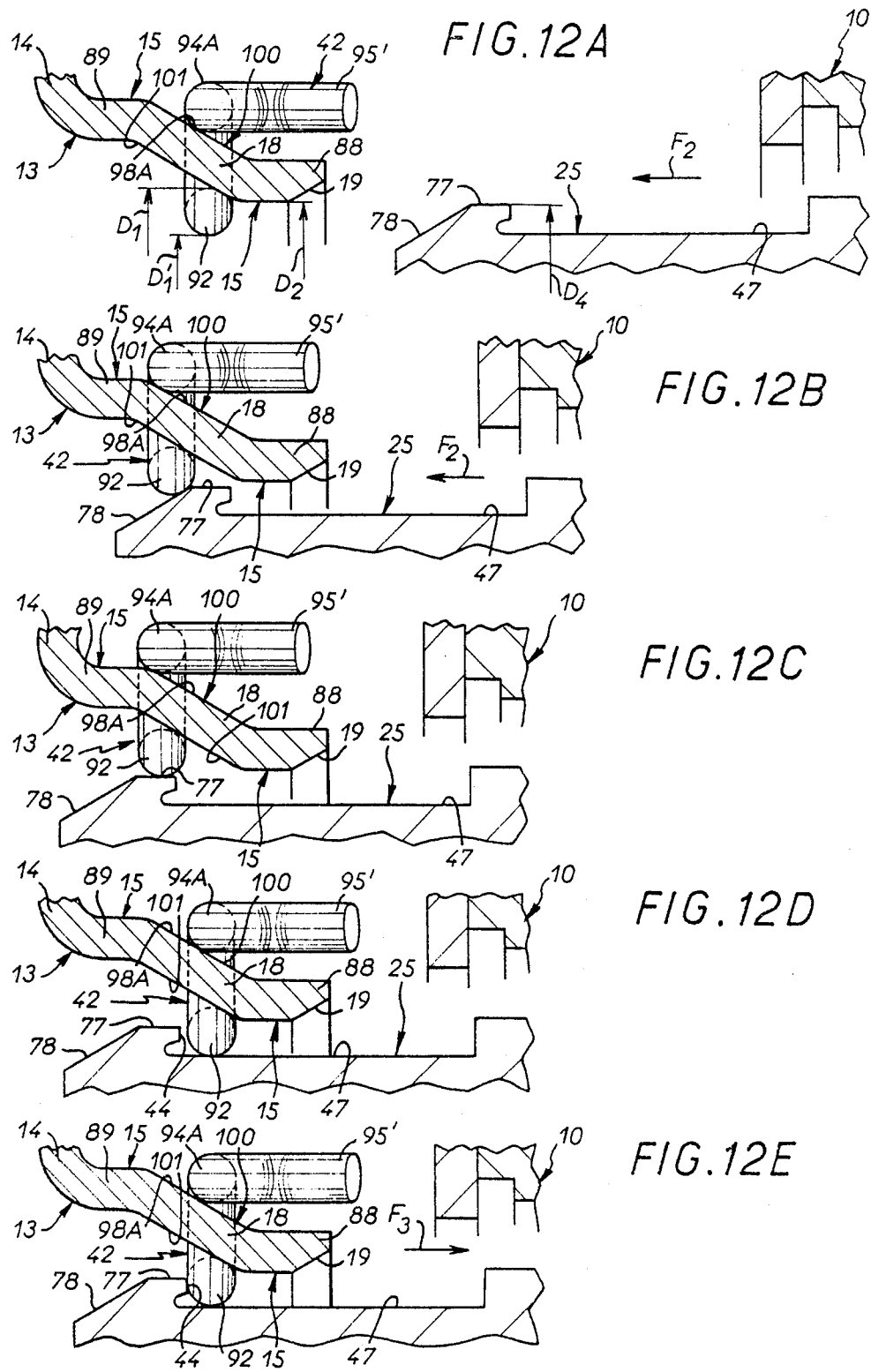

CLUTCH RELEASE BEARING ASSEMBLY IN PARTICULAR FOR AUTOMOBILE VEHICLES

BACKGROUND OF THE INVENTION

1. Field of the invention

The present invention is generally concerned with clutch release bearings, in particular those for automobile vehicles.

It is more particularly directed to so-called "pull" type clutch release bearings which are designed to operate in traction on the clutch release device of the clutch to be operated and which are coupled to this device for this purpose.

2. Description of the prior art

In some clutch release bearing assemblies, and in particular in the clutch release bearing assembly described in French Patent No. 2 304 826 and that described in U.S. patent application Ser. No. 916,805 of Oct. 8, 1986, now U.S. Pat. No. 4,733,762, it has been proposed to use between the clutch release bearing and the clutch release device to be operated, in order to couple the clutch release bearing to the clutch release device, a part referred to herein for convenience only as the "coupling part" or "action part" which, appropriately attached to the clutch release device, comprises on the side of the latter opposite the clutch release bearing a radial bearing flange through which it is adapted to bear axially on said clutch release device and thereby operate on it, and an axial bush which passes through said clutch release device, in cooperation with fastening means operative in traction between a coupling part of this kind and a part referred to herein for convenience only as the "drive part" forming part of the clutch release bearing, adapted to provide an axial coupling between said parts in the axial direction from the clutch release device to the clutch release bearing.

In practise the fastening means operative in traction employed generally comprise an annular coupling member, for example, as described in the forementioned U.S. patent application, a simple ring which is elastically deformable in the radial direction and which is carried by either of the parts to be fastened together in traction, and a substantially transverse drive bearing surface on the other of said parts and with which said annular coupling member cooperates in axial bearing engagement in the axial direction corresponding to the required axial coupling.

A particular advantage of an arrangement such as this is that it enables the clutch release device of the clutch to be operated to be fitted with the coupling part in advance, even before the corresponding clutch cover assembly is put together, and then, at the final assembly stage, the clutch release bearing to be engaged with the coupling part and thus with the clutch release device, by means of a simple clipping action.

At assembly time the drive part of the clutch release bearing is inserted axially into the coupling part and on such insertion the annular coupling member which is carried by one of said parts and which therefore, within the limits of a particular clearance or axial travel, is retained axially on the latter, is taken up by the other of said parts and, because of the action of the latter, which tends to entrain it although it is held back by the part which carries it, it is constrained to change from its normal or unstressed configuration to another, deployed or retracted configuration, in which it is engaged on or in the other of said parts until, once in line with the drive bearing surface of the latter, it assumes by virtue of its inherent elasticity a coupling configuration, which is not necessarily its initial unstressed configuration, but in which, having its drive bearing surface engaged with said part and with the part that carries it, it is adapted to provide the required axial coupling in traction of the two parts to each other when an axial drive movement in the reverse direction is applied to the clutch release bearing.

In practise, however, when it is in the ready position on the part which carries it the annular coupling member is not necessarily in the optimum position for the part which has to take it up.

To the contrary, it may by virtue of its own weight be situated off-axis relative to the latter.

Because of this, this part comes into contact with it only in the area which forms its upper part so that, because of the axial drive force that it applies to it, it tends to assume a slantwise position.

In the case of relatively small clutch release bearings, in which the annular coupling member is itself of relatively small diameter, any such slantwise disposition that may occur is usually insignificant.

The same is not true of relatively large size clutch release bearings in which the annular coupling member has a relatively large diameter.

In this case the slantwise disposition of the annular coupling member may lead to untimely jammming and, as a consequence of this, defective snap-fastening of it between the parts concerned.

Should this occur, the resulting assembly is defective and the corresponding operations have to be repeated.

To alleviate this problem consideration might be given to employing for the annular coupling member auxiliary spring centering means which either hold it elastically centered relative to the part which carries it, and spaced from the latter, or hold it elastically against a particular bearing surface on this part, for example a substantially frustoconical bearing surface, which systematically ensures that it is permanently centered relative to the latter.

However, the use of such auxiliary spring centering means inevitably results in some complexity of the assembly and, in particular, non-negligible manufacturing and assembly costs.

Consideration might also be given to providing the annular coupling member with lugs adapted to cooperate in bearing engagement with the part which carries it, so as to center it relative to the latter, for example by forming each of these lugs through localized arch or loop fashion deformation of the annular coupling member.

Even if the annular coupling member is initially disposed somewhat slantwise when taken up by the part comprising the drive bearing surface with which it has to cooperate, it is then systematically moved into a transverse plane by these lugs, being then correctly centered relative to this part.

For example, in order to achieve this result such lugs could cooperate with an edge of the part which carries it, either at one of the axial ends of the latter or by virtue of openings which are formed for them in the part concerned and through which they respectively pass, extending substantially radially.

However, in all cases it is necessary for the required centering to be achieved to obtain contact at three separate points appropriately distributed in the circumferential direction and the annular coupling member must therefore necessarily comprise three lugs.

In the case of a ring, for example, it is in practise difficult and therefore costly to form three lugs in this way on the ring.

Also, in the event that such lugs have to bear on a terminal edge of the part concerned, they must necessarily be offset in the axial direction relative to the main part of the annular coupling member on which they are provided, to the detriment of the overall axial dimension of the assembly.

A general object of the present invention is an arrangement adapted to provide satisfaction in a very simple way without any significant complication of the assembly or any particular increase in its overall axial dimension.

SUMMARY OF THE INVENTION

The present invention consists in a clutch release bearing assembly comprising a clutch release bearing and, adapted to couple said clutch release bearing to a clutch release device of a clutch, on the one hand, a coupling part adapted to be attached to said clutch release device and comprising a substantially radial bearing flange adapted to bear axially on said clutch release device and a substantially axial bush adapted to pass axially through said clutch release device, and, on the other hand, a drive part on said clutch release bearing and fastening means operative in traction between said coupling part and said drive part and adapted to couple coupling part and said drive part together in the axial direction from said clutch release device to said clutch release bearing, in which clutch release bearing assembly said fastening means comprise an annular coupling member carried by one of said coupling and drive parts and which is elastically deformable in the radial direction and a transverse drive bearing surface on the other of said coupling and drive parts, said annular coupling member is adapted to cooperate in axial bearing engagement with said drive bearing surface, said annular coupling member comprises at least two substantially radial lugs and said bush comprises respective openings each adapted to have a respective one of said at least two lugs pass through it, said clutch release bearing assembly further comprising a guide surface coaxial with said bush and a guide bearing surface forming part of said guide surface, each of said at least two lugs being adapted to cooperate in bearing engagement with said guide bearing surface.

For example, the guide surface may be formed in a very simple way by the surface of the bush of the coupling part opposite that along which the main part of the annular coupling member extends circumferentially.

Where the annular coupling member is carried by the coupling part, with its main part disposed inside the bush of the latter, this is the outside surface of the bush.

In this case the guide surface in accordance with the invention is naturally frustoconical, like the corresponding portion of the inside surface of the bush of the coupling part, especially when, as is preferably the case, the coupling part is stamped from sheet metal and therefore of substantially constant thickness, its inside and outside surfaces being then deduced the one from the other by simple axial translation.

As an alternative to this, however, the guide surface in accordance with the invention may be formed on special lugs or tangs which, in one piece with the coupling part or more generally with the part carrying the annular coupling member, are detached internally and/or externally from the volume delimited by the main part of the latter and/or are cylindrical.

In all cases this guide surface ensures permanent and appropriate centering of the annular coupling member relative to the part which carries it and therefore relative to the part having the drive bearing surface with which it has to cooperate so that, when it is taken up by this part, the annular coupling member is always appropriately disposed relative to the latter.

Any slantwise disposition of the annular coupling member being avoided in this way, the snap-fastener engagement between the parts to be fastened together in traction may be made appropriately and with complete certitude, which is advantageous.

The characteristics and advantages of the invention will emerge from the following description given by way of example with reference to the appended diagrammatic drawings.

BRIEF DESCRIPTION OF THE DRAWINGS

FIG. 3 is a view in elevation as seen in the direction of the arrow III in FIG. 1 and to a larger scale of the coupling part employed in this assembly, shown in isolation.

FIG. 4 is a plan view of this coupling part as seen in the direction of the arrow IV in FIG. 3.

FIG. 5 is locally cut-away plan view of it as seen in the direction of the arrow V in FIG. 3.

FIGS. 6, 7, 8 and 9 are partial views of it in axial cross-section on the respective lines VI—VI, VII—VII, VIII—VIII and IX—IX in FIG. 3.

FIGS. 12A, 12B, 12C, 12D and 12E are views related to that of FIG. 2 showing the coupling of the clutch release bearing concerned with the coupling part carried by the clutch release device of the clutch to be operated.

DESCRIPTION OF THE PREFERRED EMBODIMENTS

Figure 1:
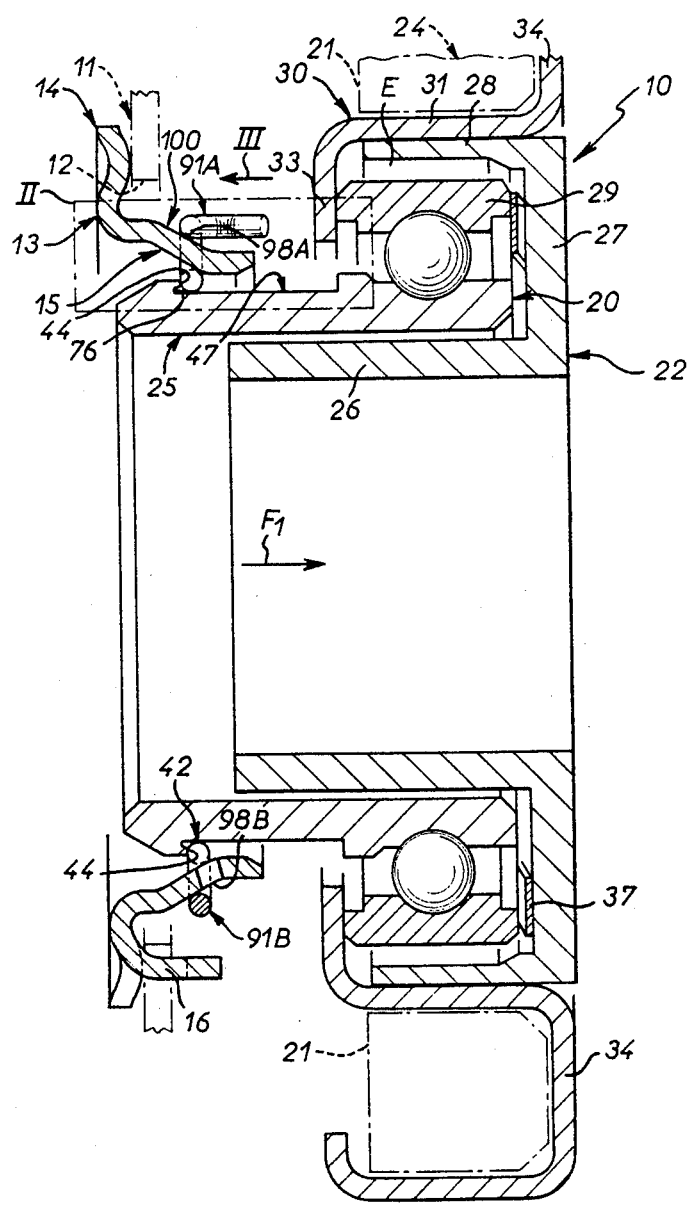
FIG. 1 is a partial view in axial cross-section of a clutch release bearing assembly in accordance with the invention.

As shown by FIG. 1, the object is to couple a clutch release bearing 10 to the clutch release device 11 of any form of clutch to be operated.

The clutch release device 11, which is shown only schematically in FIG. 1 in chain-dotted line, is, in a manner which is known per se, formed by the ends of radial fingers of a diaphragm spring, meaning an annular member which, forming part of the clutch to be operated, comprises a circumferentially continuous peripheral part forming a Belleville washer, for urging the clutch towards an engaged condition, and a central part divided by slots into radial fingers, namely the radial fingers just mentioned, to constitute levers adapted to disengage the clutch.

In a manner also known per se, for the purpose of coupling the clutch release bearing 10 to the clutch release device 11, which is necessary for the clutch release device 11 to operate in traction on the clutch release bearing 10, there is attached to the clutch release device, by means of its central opening 12, a part 13 referred to herein for convenience as the coupling part.

This coupling part 13, or action part, is of the type described in U.S. Pat. No. 4,613,027.

As a coupling part of this kind does not of itself constitute part of the present invention it will not be described in detail here.

It will suffice to mention that, on the side of the clutch release device 11 opposite the clutch release bearing 10, it comprises a radial flange 14 called the bearing flange for action on a clutch release device 11 of this kind, the bearing flange being appropriately profiled to this end, and that it comprises in one piece with the bearing flange 14, at its inside edge, a bush 15 which merges with the bearing flange 14 through a large-radius fillet and which extends substantially axially through the clutch release device 11 by means of the central opening 12 therein, and at its outside edge spaced lugs 16 which also pass axially through the clutch release device 11, each passing between two adjacent radial fingers of the latter, and each carrying cantilever fashion a circumferentially projecting retaining finger 17 at their end, in line with the bearing flange 14 and substantially parallel thereto, the retaining fingers 17 being adapted to secure, in cooperation with the bearing flange 14, axial retention of the assembly to the clutch release device 11.

As described in the aforementioned U.S. Pat. No. 4,613,027, a coupling part 13 of this kind is fitted to the clutch release device 11 by means of a bayonet type coupling: when the coupling part 13 and the clutch release device 11 have been brought sufficiently close together, the end of each of the radial fingers of the clutch release device 11 over which has to be circumferentially engaged the retaining finger 17 of the lugs 16 on the coupling part 13 is bent axially relative to the others, and the coupling part 13 is then rotated about the axis of the assembly relative to the clutch release device 11 so that such engagement becomes effective and the previously bent radial fingers of the clutch release device 11 are then released.

For reasons that will emerge hereinafter, in the embodiment shown in FIGS. 1 through 5 the axial bush 15 of the coupling part 13, which is of appropriately shaped sheet metal, features in its median area between two substantially cylindrical sections 88, 89 a substantially frustoconical section 18, that of its cylindrical sections axially farther away from its bearing flange 14, namely the section 88, having an overall diameter less that that of the other, namely the section 89.

At its free end, meaning at the free end of its smaller diameter cylindrical section 88, it is bevelled on its inside edge and so forms, for reasons that will also emerge hereinafter, a frustoconical engagement bearing surface 19.

The clutch release bearing 10 does not of itself form part of the present invention, either.

In the manner that is known per se, it comprises a drive member 20 through which it is adapted to operate on the clutch release device 11, through the intermediary of the coupling part 13, as described in detail hereinafter, a maneuvering member 22 through which it is adapted to be mounted so as to be slidable axially on any form of guide member, not shown, for example the flared guide tube that customarily projects from the housing of the associated gearbox, and coupling means which fasten the drive member 20 to the maneuvering member 22 in the axial direction and by means of which, as schematically represented in chain-dotted line in FIG. 1, it is also adapted to be operated by a control member 24 consisting of a clutch release yoke with fingers or arms 21.

The drive member 20 consists of a ball bearing.

For cooperation with the coupling part 13, it comprises a part 25 herein referred to for convenience as the drive part.

The drive part 25 consists of the inner race of this ball bearing, sufficiently lengthened in the axial direction towards the clutch release device 11 for this purpose.

This inner race is appropriately machined from a solid part of the drive part.

The maneuvering member 22 comprises an axial sleeve 26 through which it is adapted to be slidably engaged on the associated guide member and a transverse annular flange 27 at the end of the sleeve 26 opposite the drive member 20 adapted to cooperate with the latter.

At its outside periphery the annular flange 27 carries a ring 28 projecting axially, coaxially with an in the same direction as the sleeve 26, surrounding the outer race 29 of the ball bearing constituting the drive member 20.

As the clutch release bearing is of the maintained self-centering type, annular clearance is provided between the ring 28 and the ball bearing constituting the drive member 20.

The fastening means which couple the drive member 20 to the maneuvering member 22 in the axial direction comprise a cover 30 which has a skirt 31 engaged without clearance over the ring 28 of the maneuvering member 22.

At the axial end of the skirt 31 on the same side of the assembly as the clutch release device 11 the cover 30 has an upstanding edge 33 directed towards the axis of the assembly against which bears the corresponding edge of the outer race 29 of the ball bearing constituting the drive member 20.

At the other axial end of the skirt 31 the cover 30 forms two arms 34 for the fingers or arms 21 of the control member 24 to act on, in diametrally opposed positions relative to each other and projecting radially away from the axis of the assembly; i.e. outwards.

It is to be understood that means for coupling the cover 30 to the maneuvering member 22 in the axial direction are provided between the cover 30 and the maneuvering member 22.

These may be snap-fastener means, for example, elastically deformable lugs being provided for this purpose in the ring 28 of the maneuvering member 22 to cooperate with oenings also provided for this purpose in the skirt 31 of the cover 30.

These arrangements are well known in themselves, in particular from French Patent No. 2 508 125, and as they do not of themselves form part of the present invention they will not be described in more detail here.

Since, as already mentioned, the clutch release bearing is of the maintained self-centering type, there are provided between the drive member 20 and the maneuvering member 22 axially acting elastic means consisting of a corrugated washer 37 of the type marketed under the trade name "ONDUFLEX".

The corrugated washer 37 bears on the annular flange 27 of the maneuvering member 22 and on the corresponding edge of the outer race 29 of the ball bearing constituting the drive member 20, so as to urge this outer race against the upstanding edge 33 of the cover 30.

In the manner that is known per se there are provided between the drive part 25 of the clutch release bearing 10 and the coupling part 13 carried by the clutch release device 11 fastening means operative in traction adapted to procure axial coupling between these parts in the axial direction from the clutch release device 11 to the clutch release bearing 10, as schematically represented by the arrow F1 in FIG. 1.

The coupling part 13 comprises an axial bush 15 coaxial with the drive part 25 and the fastening means operative in traction are disposed between the bush 15 and the drive part 25.

To be more precise, the drive part 25 is engaged in the bush 15 of the coupling part 13 so that the fastening means operative in traction are operative between the outside periphery of the drive part 25 and the inside periphery of the bush 15.

Generally speaking, they comprise (see FIGS. 1 and 2) an annular coupling member 42 which is carried by one of the parts 13, 25 to be coupled together in traction and elastically deformable in the radial direction and a substantially transverse drive bearing surface 44 provided on the other of the parts 13, 25 and with which the annular coupling member is adapted to cooperate in axial bearing engagement in the axial direction in question, which is that shown by the arrow F1 in FIG. 1.

The annular coupling member 42 is carried by the coupling part 13, these arrangements to be described in more detail later, and the corresponding drive bearing surface 44 is therefore formed on the drive part 25.

The drive bearing surface 44 forms part of one of the flanks of a groove 47 formed at the outside periphery of the drive part 25.

This flank, which is rectilinear, perpendicular to the axis of the assembly and faces towards the control member 24 and thus towards the annular flange 27 of the maneuvering member 22, extends to the vicinity of the end of the drive part 25, and has a cut-out 76 at its root.

The drive part 25 comprises at the outside periphery of its end a cylindrical bearing surface 77 which delimits the drive bearing surface 44 in the radial direction and a frustoconical engagement bearing surface 78 which merges with the cylindrical bearing surface 77, which is disposed axially.

Let D4 denote the diameter of this cylindrical bearing surface 77.

To permit assembly to take place D4 is slightly less than the diameter D2 of the inside periphery of the substantially cylindrical smaller diameter section 88 of the bush 15 of the coupling part 13.

The annular coupling member 42 is made from round section wire appropriately rolled and shaped.

Figure 10:
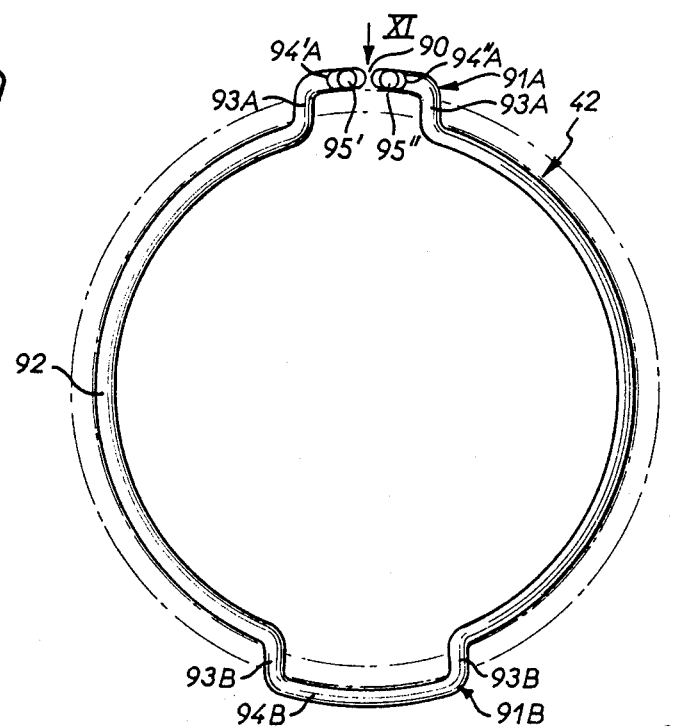
FIG. 10 is a view in elevation to the same scale as FIG. 3 showing in isolation the annular coupling member employed in the clutch release bearing assembly in accordance with the invention.
Figure 11:
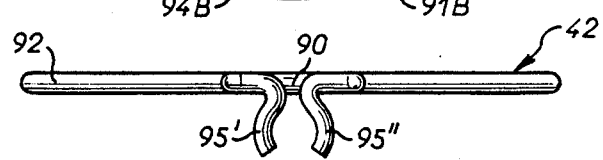
FIG. 11 is a plan view of the annular coupling member as seen in the direction of the arrow XI in FIG. 10.

Elasticity is conferred on it by a localized and substantially radial slit 90 (see FIGS. 10 and 11).

It comprises at least two localized lugs 91 each of which is substantially radial.

In the embodiments shown there are two lugs 91A, 91B in diametrally opposed positions relative to each other and each extending away from the axis of the assembly, i.e. outwards.

Each of the lugs 91A, 91B is formed by an arch-shaped localized deformation of the annular coupling member 42 and each is coplanar with the annular main part 92 of the latter.

Each of the lugs 91A, 91B comprises a central portion 94A, 94B concentric with the main part 92, from which it is offset radially, disposed substantially circumferentially and each at a respective circumferential end of the central portion 94A, 94B, so as to join it to the main part 92, two substantially rectilinear end portions 93A, 93B which are substantially parallel to each other and to the diametral plane of the assembly passing through the central area of the central portions 94A, 94B.

The slit 90 is in the median portion 94 of the arch which constitutes one of the lugs 91, namely the lug 91A, and the central portion 94A of the latter is thus divided into two parts 94'A, 94"A each projecting cantilever fashion from the corresponding end portion 93A.

Each of these sections 94'A, 94"A of the central portion 94A of the lug 91A featuring the slit 90 is extended at its free end, i.e. the end opposite the corresponding end portion 93A, by an upstanding end 95', 95" adapted, conjointly with the other one, to facilitate application of a force to open out the annular coupling member 42.

The upstanding ends 95', 95" of the annular coupling member 42 are substantially parallel to its axis and generally perpendicular to the plane of its main part 92, and each has a half-wave configuration with their concave sides facing towards each other.

The main part 92 of the annular coupling member 42 is disposed inside the bush 15 of the coupling part 13.

In accordance with the invention, its substantially radial lugs 91A, 91B pass through the bush 15 of the coupling part 13 by means of respective openings 97A, 97B formed for this purpose in the latter and each is adapted to have at least part of it cooperate bearing fashion with a guide bearing surface 98A, 98B forming part of a guide surface 100 coaxial with the bush 15.

The guide surface 100 is frustoconical and forms part of the surface of the bush 15 of the coupling part 13 opposite that along which the main part 92 of the annular coupling member 42 extends circumferentially.

In other words, it forms part of the outside surface of the bush 15, being formed in practise by the outside surface of the substantially frustoconical portion 18 of the latter.

As the coupling part 13 is of substantially constant thickness in the embodiment shown, the cone angle of the guide surface 100 in accordance with the invention is equal to that of the corresponding inside surface 101 of the substantially frustoconical portion 18 of the bush 15 of the coupling part 13, which is the surface of the latter with which the main part 92 of the annular coupling member 42 is adapted to cooperate.

It is to be understood that it is through their central portion 94A, 94B that the lugs 91A, 91B of the annular coupling member 42 cooperate with this guide surface 100, to be more precise with the corresponding guide bearing surfaces 98A, 98B of the latter.

For each of these lugs 91A, 91B of the annular coupling member 42 the bush 15 of the coupling part 13 comprises a respective opening 97A, 97B, one for each of the end portions 93A, 93B of the lugs 91A, 91B; each opening is disposed to a respective side of the corresponding guide bearing surface 98A, 98B and is axially elongate, parallel to the guide bearing surface.

The openings 97A, 97B are essentially localized to the substantially frustoconical portion 18 of the bush 15.

In the case of the lug 91A, which is that featuring the slit 90, the two openings 97A are separate and are elongate not only axially but also circumferentially.

Also, at their circumferential end opposite the guide bearing surface 98 which they border, these openings 97A are each extended by an axial portion 102A which not only extends over the larger diameter substantially cylindrical portion 89 of the bush 15 but also extends into the bearing flange 14 with which the latter is continuous.

In the case of the lug 91B of the annular coupling member 42, meaning that of which the central portion 94B is continuous, the two openings 97B in the bush 15 of the coupling part 13 are joined together in a U shape, at the end of the guide bearing surface 98B that they border, by a common circumferential central portion 105.

They thus extend over the larger diameter substantially cylindrical portion 89 of the bush 15 of the coupling part 13, extending in the axial direction as far as the bearing flange 14 of the latter, but without extending into the latter.

The guide bearing surface 98B with which the central portion 94B of the lug 91B of the annular coupling member 42 cooperates thus forms part of a tang 106 which, cut into the bush 15 of the coupling part 13, projects cantilever fashion from the bearing flange 14 of the latter.

The guide surface 100 in accordance with the invention is extended by a cylindrical surface 108 adapted, as will emerge hereinafter, to hold the annular coupling member 42 in a decoupling configuration.

In practise this is the outside surface of the larger diameter substantially cylindrical portion 89 of the bush 15 of the coupling part 13.

Figure 2:
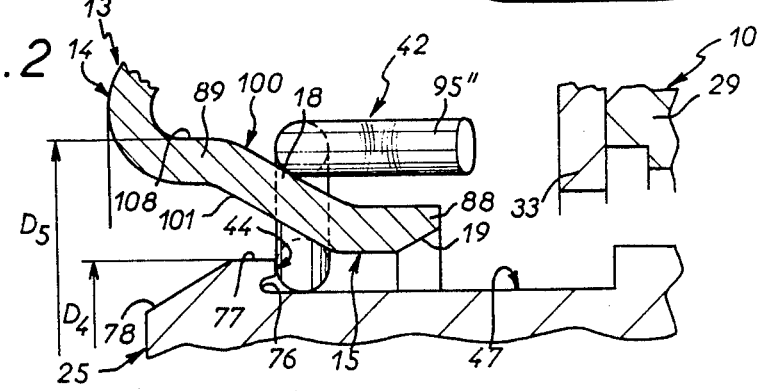
FIG. 2 shows to a larger scale the detail marked II—II in FIG. 1.

Let D5 denote its diameter (FIG. 2).

As will be readily understood, the axial extent of this cylindrical surface 108, in conjunction with that of the larger diameter substantially cylindrical portion 89 of the bush 15, is for the most part due to the large radius fillet through which the latter merges with the bearing flange 14.

The annular coupling member 42 is fitted in advance to the coupling part 13 which is in turn designed to be fitted in advance to the clutch release device 11 of the clutch to be operated.

To fit it onto the coupling part 13 the annular coupling member 42 is offered up on a slant from the bearing flange 41 end, beginning by inserting its lug 91B into the circumferential central portion 105 which joins up the openings 97B in the bush 15, with the lug 91B hooked over the corresponding tang 106 of the latter.

It is then straightened up and the upstanding ends 95', 95" of its lug 91A are then inserted one after the other into the corresponding openings 97A in the bush 15.

The central portions 94A, 94B of the lugs 91A, 91B of the annular coupling member 42 then bear on the guide bearing surface 98A, 98B of the coupling part 13.

Given that the guide surface 100 of which these guide bearing surfaces 98A, 98B form part is conical and given its inherent elasticity, when it is released it moves of its own accord along the corresponding substantially frustoconical portion 18 of the bush 15 of the coupling part 13 until it comes to rest (FIG. 12A) near the end of the substantially frustoconical portion 18 adjacent the smaller diameter substantially cylindrical portion 88 of the bush 15.

In the corresponding unstressed configuration the central portion 94A, 94B of the lugs 91A, 91B of the annular coupling member 42 bears against the corresponding guide bearing surface 98A, 98B of the coupling part 13, to be more precise of the bush 15.

The arrangements are such that its main part 92 is in contact with the inside surface 101 of the corresponding substantially frustoconical portion 18 of the bush 15, or is at least in its immediate vicinity, the length of the end portions 93A, 93B of its lugs 91A, 91B having been chosen to achieve this.

By virtue of the arrangement in accordance with the invention, that is to say by virtue of the central portion 94A, 94B of the lugs 91A, 91B of the annular coupling member 42 bearing on the coaxial guide bearing surface 98A, 98B of the bush 15 of the coupling part 13, the annular coupling member 42, or its main part 92, to be more precise, is at least substantially correctly centered relative to the bush 15, given the clearance necessary for fitting it.

Thus the main part 92 of the annular coupling member 42 is appropriately centered relative to the axis of the assembly and, in particular, relative to the drive part 25 of the clutch release bearing 10.

It will also be noted that the lugs 91A, 91B of the annular coupling member 42 are correctly retained in the axial direction, within particular limits of axial movement as will be explained later, on the coupling part 13, without there being any necessity to provide any other means of limiting their axial movement on the latter.

Let D1 and D'1 respectively denote the outside diameter and the inside diameter of the main part 92 of the annular coupling member 42 in its unstressed configuration (FIG. 12A).

The diameter D1 is greater than that D2 of the inside periphery of the smaller diameter substantially cylindrical portion 88 of the bush 15 of the coupling part 13 and the diameter D'1 is less than that D4 of the cylindrical bearing surface 77 of the drive part 25 of the clutch release bearing 10.

Thus if, as shown by the arrow F2 in FIGS. 12A, 12B, the clutch release bearing 10 when operated on by the control member 24 has its drive part 25 inserted in the bush 15 of the coupling part 13, it is through the frustonical engagement bearing surface 78 of its drive part 25 that it takes up (see FIG. 12B) the annular coupling member 42, to be more precise the main part 92 of the latter.

However, for the reasons stated above, when this occurs the annular coupling member 42 is appropriately centered relative to the drive part 25 and it is therefore taken up along a circumference, without any risk of it becoming disposed slantwise.

As insertion of the clutch release bearing 10 continues (FIG. 12C) the annular coupling member 42 is entrained axially by the drive part 25 and also deformed radially by the latter, because of the action of the engagement bearing surface 78 which is made frustoconical for this very purpose.

Pushed back in the radial direction, the main part 92 of the annular coupling member 42 is pressed against the inside surface 101 of the substantially frustoconical portion 18 of the bush 15 of the coupling part 13, following this surface in the direction towards the bearing flange 14 of the latter.

Conjointly, the central portions 94A, 94B of the lugs 91A, 91B of the annular coupling member 42 remain substantially in contact with the corresponding guide bearing surfaces 98A, 98B of the coupling part 13.

When the clutch release bearing 10 is sufficiently inserted (FIG. 12) for the drive bearing surface 44 on its drive part 25 to have passed beyond the main part 92 of the annular coupling member 42, the latter tends to revert spontaneously to its initial unstressed configuration, for the reasons already explained.

Its main part 92 then becomes inserted radially into the groove 47 in the drive part 25 of the clutch release bearing 10.

Thus if, as shown by the arrow F3 in FIG. 12E, a reverse axial movement is applied to it, by the maneuvering member 24 and as previously, for example, the annular coupling member 42 or to be more precise its annular main part 92 is engaged between the drive bearing surface 44 on the drive part 25 of the clutch release bearing 10 and the inside frustoconical surface 101 of the bush 15 of the coupling part 13.

The required coupling is thus achieved: if as shown by the arrow F1 in FIG. 1, which corresponds to arrow F3 in FIG. 12E, a traction force is exerted on the clutch release bearing 10 by the control member 24, this traction force is transmitted to the clutch release device 11 through, successively, the annular coupling member 42, by the drive bearing surface 44, and the coupling part 13, by the frustoconical inside surface 101 of the bush 15 of the latter.

It is to be understood that sufficient assembly clearance (not shown in the figures) is provided between the annular coupling member 42 and the coupling part 13 so that in service the latter can follow the clutch release device 11 as it deforms.

Decoupling may be achieved manually, for example, using a tool adapted to separate the upstanding ends 95′, 95″ of the annular coupling member 42.

Figure 13:
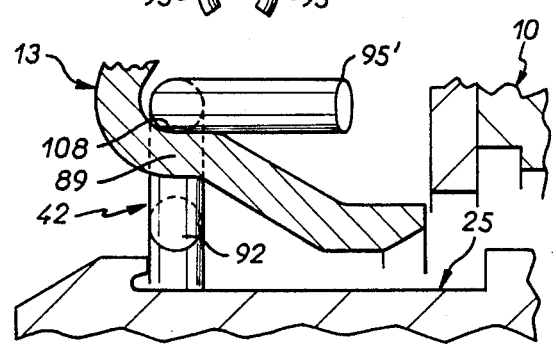
FIG. 13 is a view analogous to that of FIG. 2 showing a decoupling configuration of the annular coupling member concerned.

As shown in FIG. 13 the annular coupling member 42 is then on the cylindrical surface 108 provided for this purpose on the coupling part 13 and because it is in its deployed configuration, which is a decoupling configuration, the drive part 25 of the clutch release bearing 10 can escape from its main part 92.

As an alternative to this, in order to secure decoupling use may be made of an annular decoupling member 46 adapted to constrain the annular coupling member 42 to change from its coupling or unstressed configuration to a decoupling configuration adapted to enable it to release the drive part 25 of the clutch release bearing 10.

Figure 14:
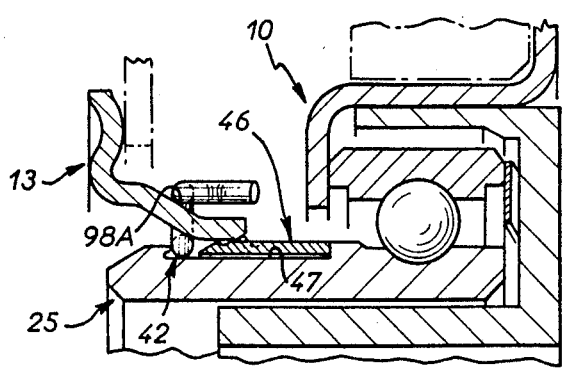
FIG. 14 is a partial view in axial cross-section analogous to that of FIG. 1 for an alternative embodiment of the clutch release bearing assembly in accordance with the invention.

As shown in FIG. 14, an annular decoupling member 46 of this kind is disposed to be movable axially in the groove 47 in the drive part 25.

The corresponding arrangements do not of themselves form part of the present invention and as they are disclosed in the aforementioned U.S. Pat. No. 4,613,027 they will not be described further here.

It is to be understood that the present invention is not limited to the embodiments described and shown, but encompasses any variant execution.

Specifically, although in the foregoing description the drive part of the clutch release bearing consists in the inside race of the ball bearing that the clutch release bearing comprises, it could equally well be formed by the outer race of the bearing.

Also, instead of being in one piece with a bearing race, the drive part could equally well be merely coupled to the latter in the axial direction.

Furthermore, although the annular coupling member in accordance with the invention preferably comprises only two lugs, for reasons of simplicity of manufacture in particular, the scope of the invention is not exceeded by providing it with a greater number of such lugs.

Furthermore, the lugs that this annular coupling member comprises in this way are not necessarily the result of simple arched-shape localized deformation of the latter, but could equally well, for example, be attached to its main part and/or have any other configuration or construction.

Also, these lugs could equally well cooperate with a guide surface coaxial with the bush of the coupling part through a portion other than their central portion, conjointly with the latter or otherwise.

Finally, instead of being frustoconical this guide surface could alternatively be cylindrical, for example, in which case there would preferably be a shoulder on the side towards the bearing flange to limit the capacity for axial movement of the annular coupling member in this direction.

We claim:

1. Clutch release bearing assembly comprising a clutch release bearing and, adapted to couple said clutch release bearing to a clutch release device of a clutch, on the one hand, a coupling part adapted to be attached to said clutch release device and comprising a substantially radial bearing flange adapted to bear axially on said clutch release device and a substantially axial bush adapted to pass axially through said clutch release device, and, on the other hand, a drive part on said clutch release bearing and fastening means operative in traction between said coupling part and said drive part and adapted to couple said coupling part and said drive part together in the axial direction from said clutch release device to said clutch release bearing, in which clutch release bearing assembly said fastening means comprise an annular coupling member carried by one of said coupling and drive parts and which is elastically deformable in the radial direction and a transverse drive bearing surface on the other of said coupling and drive parts, said annular coupling member is adapted to cooperate in axial bearing engagement with said drive bearing surface, said annular coupling member comprises at least two substantially radial lugs and said bush comprises respective openings each adapted to have a respective one of said at least two lugs pass through it, said clutch release bearing assembly further comprising a guide surface coaxial with said bush and a guide bearing surface forming part of said guide surface, each of said at least two lugs being adapted to cooperate in bearing engagement with said guide bearing surface said guide surface being part of the surface of said bush of said coupling part opposite that along which the main part of said annular coupling member extends circumferentially.

2. Clutch release bearing assembly according to claim 1, wherein said guide surface is frustoconical.

3. Clutch release bearing assembly according to claim 1, wherein said main part of said annular coupling member is adapted to cooperate with a surface of said bush of said coupling part which is also frustoconical, the cone angle of said guide surface being equal to that of said surface of said bush.

4. Clutch release bearing assembly according to claim 1, wherein said annular coupling member comprises two lugs in substantially diametrally opposite positions relative to each other.

5. Clutch release bearing assembly according to claim 1, wherein each of said lugs of said annular coupling member is formed by localized arch-shaped deformation of the latter coplanar with its main part.

6. Clutch release bearing assembly according to claim 5, wherein said bush of said coupling part comprises, each disposed on a respective side of the corresponding guide surface and elongate axially and parallel thereto, said openings for each of said lugs of said annular coupling member, one for each of said end parts thereof.

7. Clutch release bearing assembly according to claim 6, wherein said two openings in said bush of said coupling part for said lug of said annular coupling member whereof said central portion is continuous are joined up to constitute a U-shape at the end of said guide bearing surface.

8. Clutch release bearing assembly according to claim 5, wherein said annular coupling member comprises a slit in the central portion of an arch formed by one of said lugs, said central portion thereby being divided into two parts.

9. Clutch release bearing assembly according to claim 8, wherein said bush of said coupling part comprises, each disposed on a respective side of the corresponding guide surface and elongate axially and parallel thereto, two said openings for each of said lugs of said annular coupling member, one for each of said end parts thereof, said two separate openings in said bush of said coupling part associated with said one lug of said annular coupling member being elongate not only axially but also circumferentially.

10. Clutch release bearing assembly according to claim 9, wherein said openings are each extended by an axial portion at their circumferential and remote from the associated guide bearing surface.

11. Clutch release bearing assembly according to claim 8, wherein each of said parts of said central portion of said lug of said annular coupling member comprising said slit comprises an upstanding end adapted, conjointly with the other, to facilitate application of a force adapted to open out said annular coupling member.

12. Clutch release bearing assembly comprising a clutch release bearing and, adapted to couple said clutch release bearing to a clutch release device of a clutch, on the one hand, a coupling part adapted to be attached to said clutch release device and comprising a substantially radial bearing flange adapted to bear axially on said clutch release device and a substantially axial bush adapted to pass axially through said clutch release device, and, on the other hand, a drive part on said clutch release bearing and fastening means operative in traction between said coupling part and said drive part and adapted to couple said coupling part and said drive part together in the axial direction from said clutch release device to said clutch release bearing, in which clutch release bearing assembly said fastening means comprise an annular coupling member carried by one of said coupling and drive parts and which is elastically deformable in the radial direction and a transverse drive bearing surface on the other of said coupling and drive parts, said annular coupling member is adapted to cooperate in axial bearing engagement with said drive bearing surface, said annular coupling member comprises at least two substantially radial lugs and said bush comprises respective openings each adapted to have a respective one of said at least two lugs pass through it, said clutch release bearing assembly further comprising a guide surface coaxial with said bush and a guide bearing surface forming part of said guide surface, each of said at least two lugs being adapted to cooperate in bearing engagement with said guide bearing surface a cylindrical surface forming an extension of said guide surface and being adapted to hold said annular coupling member in a decoupling configuration.

13. Clutch release bearing assembly comprising a clutch release bearing and, adapted to couple said clutch release bearing to a clutch release device of a clutch, on the one hand, a coupling part adapted to be attached to said clutch release device and comprising a substantially radial bearing flange adapted to bear axially on said clutch release device and a substantially axial bush adapted to pass axially through said clutch release device, and, on the other hand, a drive part on said clutch release bearing and fastening means operative in traction between said coupling part and said drive part and adapted to couple said coupling part and said drive part together in the axial direction from said clutch release device to said clutch release bearing, in which clutch release bearing assembly said fastening means comprise an annular coupling member carried by one of said coupling and drive parts and which is elastically deformable in the radial direction and a transverse drive bearing surface on the other of said coupling and drive parts, said annular coupling member is adapted to cooperate in axial bearing engagement with said drive bearing surface, said annular coupling member comprises at least two substantially radial lugs and said bush comprises respective openings each adapted to have a respective one of said at least two lugs pass through it, said clutch release bearing assembly further comprising a guide surface coaxial with said bush and a guide bearing surface forming part of said guide surface, each of said at least two lugs being adapted to cooperate in bearing engagement with said guide bearing surface, said annular coupling member being carried by said coupling part, said main part thereof being disposed inside said bush of the latter, said lugs extending radially away from the axis of the assembly and said guide surface forming part of the outside surface of said bush.

14. Clutch release bearing assembly comprising a clutch release bearing and, adapted to couple said clutch release bearing to a clutch release device of a clutch, on the one hand, a coupling part adapted to be attached to said clutch release device and comprising a substantially radial bearing flange adapted to bear axially on said clutch release device and a substantially axial bush adapted to pass axially through said clutch release device, and, on the other hand, a drive part on said clutch release bearing and fastening means operative in traction between said coupling part and said drive part and adapted to couple said coupling part and said drive part together in the axial direction from said clutch release device to said clutch release bearing, in which clutch release bearing assembly said fastening means comprise an annular coupling member carried by one of said coupling and drive parts and which is elastically deformable in the radial direction and a transverse drive bearing surface on the other of said coupling and drive parts, said annular coupling member is adapted to cooperate in axial bearing engagement with said drive bearing surface, said annular coupling member comprises at least two substantially radial lugs and said bush comprises respective openings each adapted to have a respective one of said at least two lugs pass through it, said clutch release bearing assembly further comprising a guide surface coaxial with said bush and a guide bearing surface forming part of said guide surface, each of said at least two lugs being adapted to cooperate in bearing engagement with said guide bearing surface, said drive bearing surface forming part of one flank of a groove in which is mounted to be mobile axially an annular decoupling member adapted to constrain said annular coupling member to change from its coupling configuration to a decoupling configuration and, in the latter configuration, to release said drive part.

* * * * *